June 28, 1960 J. K. WEBB 2,943,193

SYNCHRONOUS DETECTION SYSTEM

Filed May 27, 1958 4 Sheets-Sheet 1

INVENTOR.
JOHN K. WEBB

BY Wade Koontz and George Fine
ATTORNEYS

INVENTOR.
JOHN K. WEBB
BY Wade Koontz Jr.
George Fine
ATTORNEYS

INVENTOR.
JOHN K. WEBB
BY Wade Koontz and George Fine
ATTORNEYS

INVENTOR.
JOHN K. WEBB
BY Wade Koontz and George Fine
ATTORNEYS 2,943,193

SYNCHRONOUS DETECTION SYSTEM

John K. Webb, Utica, N.Y., assignor to the United States of America as represented by the Secretary of the Air Force Filed May 27, 1958, Ser. No. 738,243

7 Claims. (Cl. 250—20)

This invention relates to communication receivers and more particularly to receivers including detectors of the synchronous type.

In the synchronous detection process, a two-phase detection is accomplished in order to derive phase information used to phase lock a local oscillator to its optimum position for the received double sideband signal. Basically, the system consists of two basic synchronous detectors with quadrature injection voltages. The two audio voltage outputs are compared in an audio phase detector in order to derive phase control information for the oscillator that supplies the injection voltages. In the direct conversion receiver, the local oscillator operates at the signal frequency. The detector local oscillator operates at the intermediate frequency of a conventional superheterodyne and phase control information can be supplied to either the intermediate frequency oscillator or the oscillator concerned in the first conversion.

The heart of the synchronous detector is the phase control loop. The oscillator phase control information is derived from the sidebands of a received double sideband signal. An amplitude modulated signal is considered first, only for the sake of convenience. The operation of the phase control loop is governed by sideband information and it does not matter whether the sidebands are the product of an amplitude or frequency modulation process. The synchronous detector is then an optimum receiver for all signals in which intelligence is conveyed in first order sideband components.

The phase detector is comprised of two basic rectifiers, connected so that their D.C. outputs are of the same polarity and the A.C. input signals are cancelled in the output. This arrangement allows fast response in the phase-control loop while being unaffected by the audio signals themselves. The phase detector output is applied as a control signal to the local oscillator reactance tube to correct for phase errors.

An initial condition of phase lock has been assumed. If a double-sideband signal were to be presented to the synchronous detector with its optimum carrier phase position several hundred cycles away, the phase detector would develop an increasing error control voltage until finally a phase lock would be achieved. This cannot be shown vectorially because the frequencies involved are constantly changing as the local oscillator approaches a lock point. This process occurs in only a few modulation cycles and is not noticeable with speech transmission. The width over which the phase loop will lock is determined by its bandwidth. The bandwidth is purposely made small to prevent carrier capture by interfering signals. This anti-capture feature may not appear significant until the receiver is operated in a crowded spectrum of AM signals. Here, two strong interfering carriers, equally spaced about the operating frequency, will capture the local oscillator.

Conventional superheterodyne receivers have been considerably complicated by the use of several techniques for shaping the IF bandpass to improve the interference rejection. Mechanical filters have been used to obtain steep skirts on the bandpass. Q multipliers and crystal filters have been used to notch the IF response curve in an effort to eliminate interference. The use of such devices is entirely unnecessary in a synchronous detection process and an IF bandpass of nearly ideal shape can be obtained by utilizing post detector audio filtering. Audio filters are much more stable and less complex than either crystal or mechanical filters.

The interference rejection circuitry utilized in the synchronous detector is basically the same as is utilized for sideband selection in the phasing method of single sideband reception. The circuitry then makes the synchronous detector compatible with single sideband systems. The interference circuitry is comprised of a wideband audio phase shift network having a phase shift of 90 degrees.

In accordance with the present invention a synchronous detector adapter is provided. The adapter receives a signal tuned to appear in a communication receiver IF channel and demodulates the received signal with two RF signals having the same frequency but differing in phase by 90°. Then each of the demodulated signals (audio) are fed to separate amplifiers. The audio signals presented to the two amplifiers are 90° out of phase for any single frequency, but are in phase if there are two like sideband components. The amplified audio signals are compared in a phase detector which delivers a D.C. control voltage to a reactance tube. The reactance tube operates in combination with a local oscillator for phase control thereof. The D.C. control voltage applied to the reactance tube appears in such magnitude and polarity as to correct the phase of the aforesaid local oscillator as required. The control of the local oscillator is necessairy as it generates the R.F. signal which is utilized to provide the aforesaid two R.F. demodulating signals. The correction of the phase is to the position for optimum demodulation conditions. There are also provided two separate channels for each of the amplifier output signals. In each of the channels there is a phase shift network. In the case of a double sideband signal the output is taken from one network, but for single sideband use the output signals from each of the networks are combined, then, the upper and lower sideband voltages will appear in opposite phases in the output. This allows selection of either sideband, whichever is being utilized.

When the amplified audio is taken through the two aforementioned phase shift networks and then combined, interference rejection may be obtained. When the adapter is locked on a double sideband signal containing interference in the lower sideband, for example, one channel produces audio resulting from both sidebands and also produces lower sideband interference, while the other channel contains only interfering audio. Phase cancellation by combining the output signals from said phase shifting networks will remove the interference while still adding the desired information in both sidebands. Other combinations are also possible.

The present invention also provides AGC and it is an improvement over conventional AVC, as AVC regulates on carrier information and the present circuit operates on audio output independent of modulation percentages.

There is also provided means for utilizing the adapter as a SSB converter. SSB, or either sideband of a DSB, AM, NFM, or PM signal may be selected.

An object of the present invention is to provide a synchronous detection adapter for a superheterodyne communication receiver.

A further object of the present invention is to provide a communication receiver including a synchronous detector thereby permitting the utilization of an improved audio operated AGC circuit.

A still further object of the present invention is to provide a communication receiver of the superheterodyne type including a synchronous detector adapter which achieves improved interference rejection.

Yet another object of the present invention is to provide a synchronous detector with an improved audio phase detector.

A still further object of the present invention is to provide a superheterodyne communication receiver, a detector of the synchronous type whose audio phase detector utilizes AGC to prevent over-driving.

An object of the present invention is to provide a communication receiver utilizing a synchronous detector in which means are included to reject either upper or lower sideband interference.

In the accompanying specification, I shall describe, and in the annexed drawings, show what is at present considered a preferred embodiment of my present invention. It is, however, to be clearly understood that I do not wish to be limited to the exact details herein shown and described as they are for purposes of illustration only, inasmuch as changes therein may be made without the exercise of invention and within the true spirit and scope of the claims hereto appended.

Figure 1:
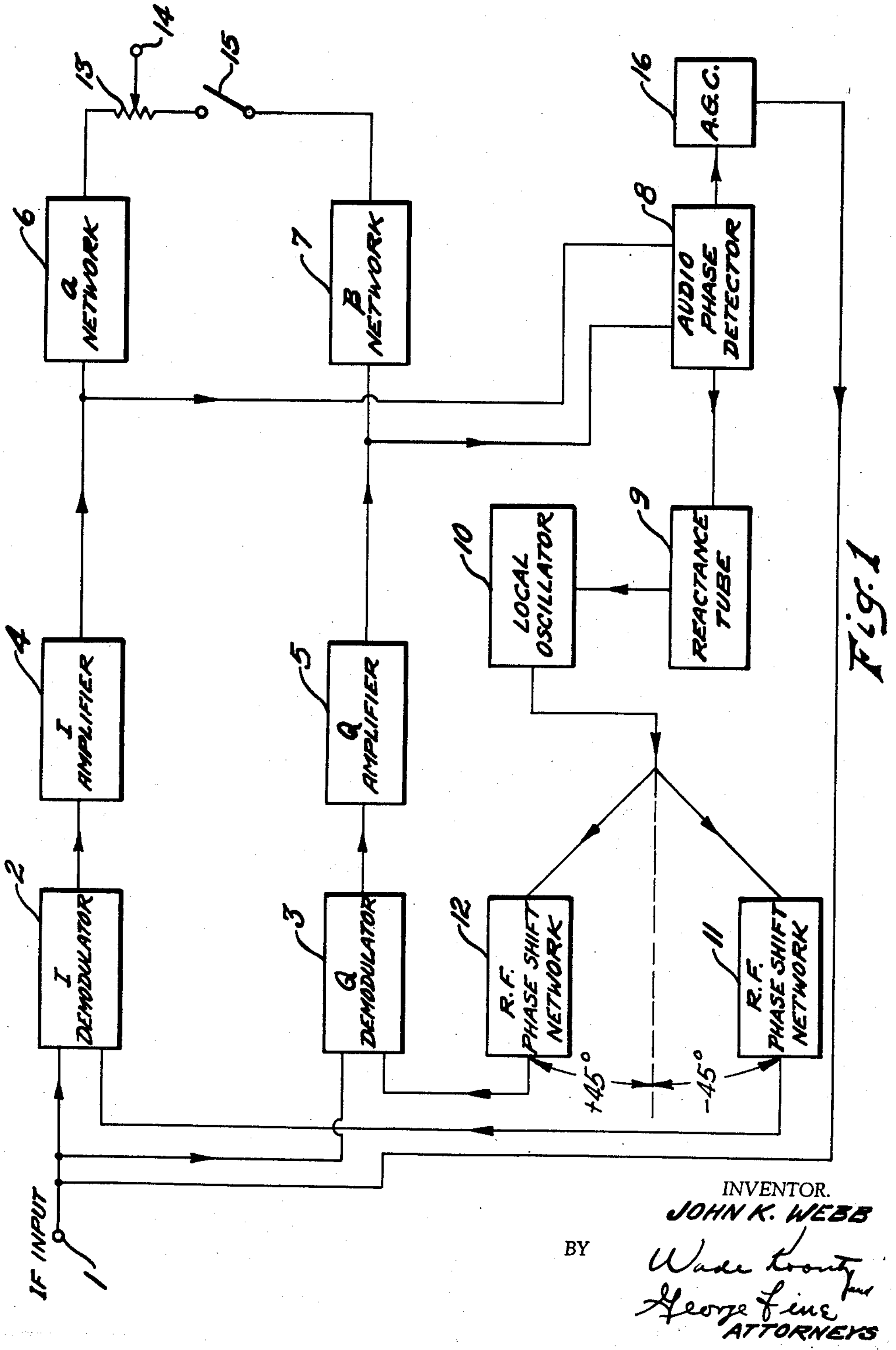
Fig. 1 is a block diagram of a superheterodyne communication receiver which includes a synchronous detector system in accordance with the principles of my present invention.

Now referring to Fig. 1, a synchronous detector system is shown which may be utilized to adapt a superheterodyne receiver to synchronous detection. The adapter receives signals tuned to appear in a superheterodyne receiver IF strip. The adapter is connected to said superheterodyne receiver via the second detector tube socket. The IF signal is brought out and fed to terminal 1 of the adapter. This IF signal input is applied to in phase demodulator 2 and also to quadrature demodulator 3. The output signal from demodulator 2 is fed through amplifier 4 and the amplified signal is then simultaneously applied to alpha network 6 and audio phase detector 8. The output signal from demodulator 3 is fed through amplifier 5 and the amplified signal is then simultaneously applied to beta network 7 and audio phase detector 8. Demodulators 2 and 3 have their local oscillator injection voltages in-phase quadrature to each other. When the in-phase channel local oscillator injection voltage is the same phase as the carrier (transmitted or suppressed) component of the AM signal then, the in-phase or "I" channel will contain the demodulated signal while the quadrature or "Q" channel will contain no audio as its injected local oscillator signal is shifted 90°.

When local oscillator 10 drifts slightly, the "I" channel will be relatively unaffected but "Q" channel will produce audio. This will have the same polarity as "I" channel audio for one direction of local oscillator drift (and opposed polarity for opposite direction of local oscillator drift). The "Q" channel level will be proportional to the oscillator drift for small errors. By combining the "I" and "Q" audio in phase detector 8, a D.C. control voltage is obtained. This control voltage tunes local oscillator 10 by way of reactance tube 9 and returns or "locks" oscillator 10 to the correct phase, where audio is present only in the "I" channel.

Audio phase detector 8 delivers a D.C. voltage only when the "I" and "Q" audio signals have in-phase components. A different situation exists when the received signal is either a single sideband signal or a single frequency continuous wave signal. Here the "I" and "Q" audio voltages are in quadrature and will cause no phase detector output for phase locking oscillator 10. With no phase lock, audio appears in both "I" and "Q" channels and alpha and beta networks 6 and 7 respectively, (90° phase shift networks). The audio output signals from alpha and beta networks 6 and 7, respectively, are combined and thus provide an audio signal representative of either aforesaid single sideband signal or aforesaid continuous wave signal.

If "I" and "Q" outputs are taken through alpha and beta networks 6 and 7 respectively and then combined, interference rejection may also be obtained. When locked on a double sideband signal containing interference in the lower sideband, for example "I" channel produces audio resulting from both sidebands and also produces lower sideband interference, while "Q" channel contains only interfering audio. Phase cancellation by combining the two audio outputs will remove the interference while still adding the desired information on both sidebands. Other combinations are obviously possible.

The local oscillator injection voltages fed to demodulators 2 and 3 respectively, are in phase quadrature to each other. They are produced by utilizing the signal output of local oscillator 10 and feeding it simultaneously to RF phase shift networks 11 and 12 respectively. The output signal from phase shift network 11 is fed to "I" demodulator 2 and the signal output from RF phase shift network 12 is fed to "Q" demodulator 3.

A D.C. voltage is obtained from AGC circuit 16, this AGC voltage is obtained from the signal output from audio phase detector 8. It is rectified and fed back to terminal 1. The audio output is derived at terminal 14. Switch 15 is utilized to reject interference.

Figure 3:
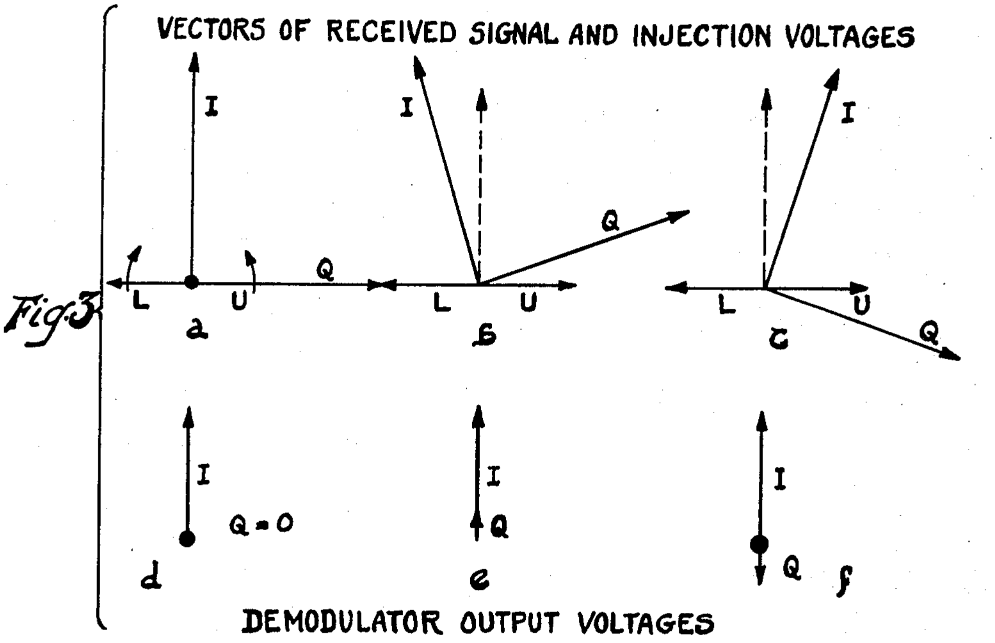
Fig. 3 is a vector diagram relating phase of injection voltages to demodulator output voltage and polarity.
Figure 2:
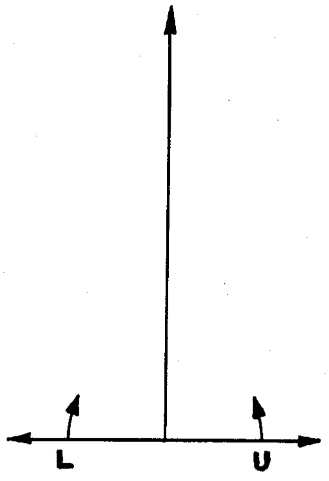
Fig. 2 is a vector representation of an AM signal.

Fig. 2 is a vector representation of a tone-modulated AM signal. The carrier ($c$) is represented as the fixed reference vector, U and L represent the upper and lower sidebands, rotating in opposite directions with respect to the carrier at the angular velocity of the modulation frequency. Figs. 3*a* and 3*d* show the same AM signal as it appears in the I and Q demodulators, with the injection voltages superimposed. In Fig. 3*a*, the I injection voltage is shown phase-locked to its optimum position. The I demodulator audio output voltage is shown in Fig. 3*d*. It can be seen that I audio is at its optimum value, and that the Q audio is nulled because of the quadrature relationship of the I and Q injection voltages. The presence of the transmitted carrier is obviously no longer necessary, for in the I channel the injection voltage is identical to the carrier. The carrier phase position then becomes identical to the optimum phase position for the I injection voltage which is shown in Figs. 3*b* and 3*c* as a dotted line. The nomenclature associated with the two audio channels in the synchronous detector is then derived from this injection voltage relationship. The I channel injection voltage is in phase with the optimum phase position, and the Q channel injection voltage is in quadrature. In order to receive complex waveforms such as square waves used in digital systems, the demodulated frequency components of the complex waveforms must add in the proper phase relationship. This demands that the component frequencies of the received signal at the detector have the same phase relationship as the transmitter. As has been shown, the synchronous detector positions the locally generated carrier in its optimum position with respect to the sidebands.

Figs. 3*b* and 3*c* show the effects of improper oscillator phase in the synchronous detector. Figs. 3*e* and 3*f* show that the Q audio components resulting from detection with improper phase have polarities determined by the direction of oscillator drift, and magnitude determined by the phase error. The I audio is relatively unaffected then by small amounts of oscillator drift. It would not be necessary for the oscillator alone to drift; the drift could be a combination of effects from both local oscillator and the received signal. The received signal may be shifted in frequency either by transmitter instability or supersonic aircraft. Phase control information is then derived from the I and Q audio signals by comparing them in a phase detector.

Figure 4:
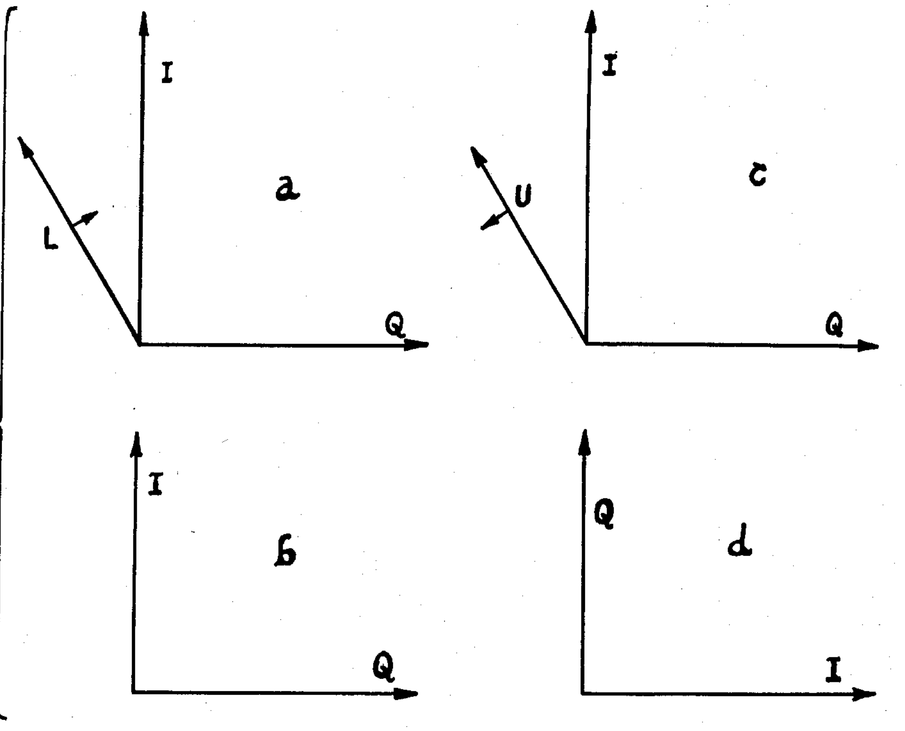
Fig. 4 is a vector diagram showing how I and Q audio interference signals are related to upper and lower sideband interference.
Figure 5:
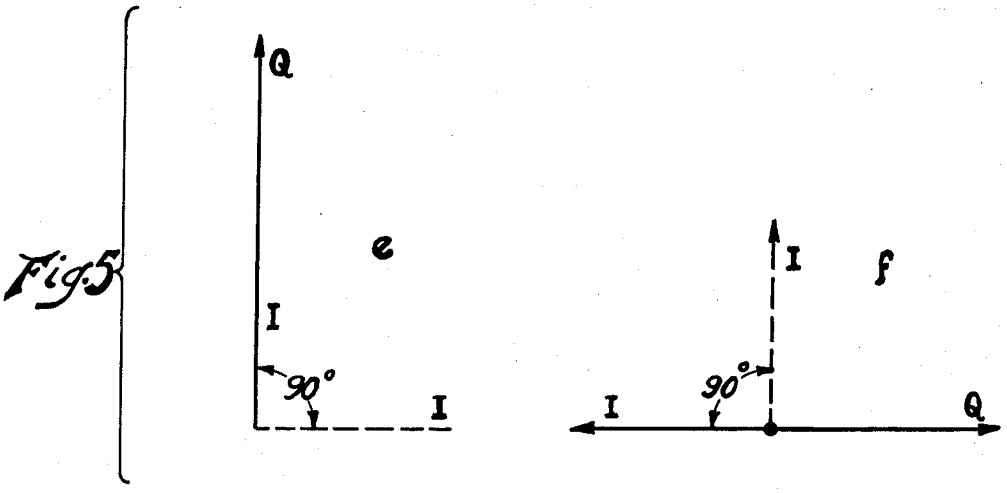
Fig. 5 shows an example of addition of sideband components with I shifted 90°, leading with respect to Q.

Now referring to the interference rejection circuit, Fig. 4a is a vector diagram showing the I and Q injection voltages and an interfering signal (L) in the lower sideband. Fig. 4b shows the resulting I and Q interference audio signals. They are in quadrature with I leading Q. Figs. 4c and 4d are vector diagrams of the upper sideband interference case. The only difference that is noted is that Q leads I. The interference rejection circuitry is comprised of a wideband audio phase shift network having a phase shift of 90° and is shown in the block diagram of Fig. 1 as the alpha and beta networks. The phase of the I and Q audio signals is shifted by 90° and the two are combined either additively or subtractively as shown in Fig. 5. In either case, the interference components in one sideband will be cancelled, while those in the other sideband will be added. The transmitted information in both sidebands of a double-sideband signal is retained while rejecting interference from either sideband. This is because the I channel contains both interference and desired signal and the Q channel contains only interference. Therefore, the destructive addition will occur only with interference components and have no effect upon a desired double-sideband signal.

Figure 6:
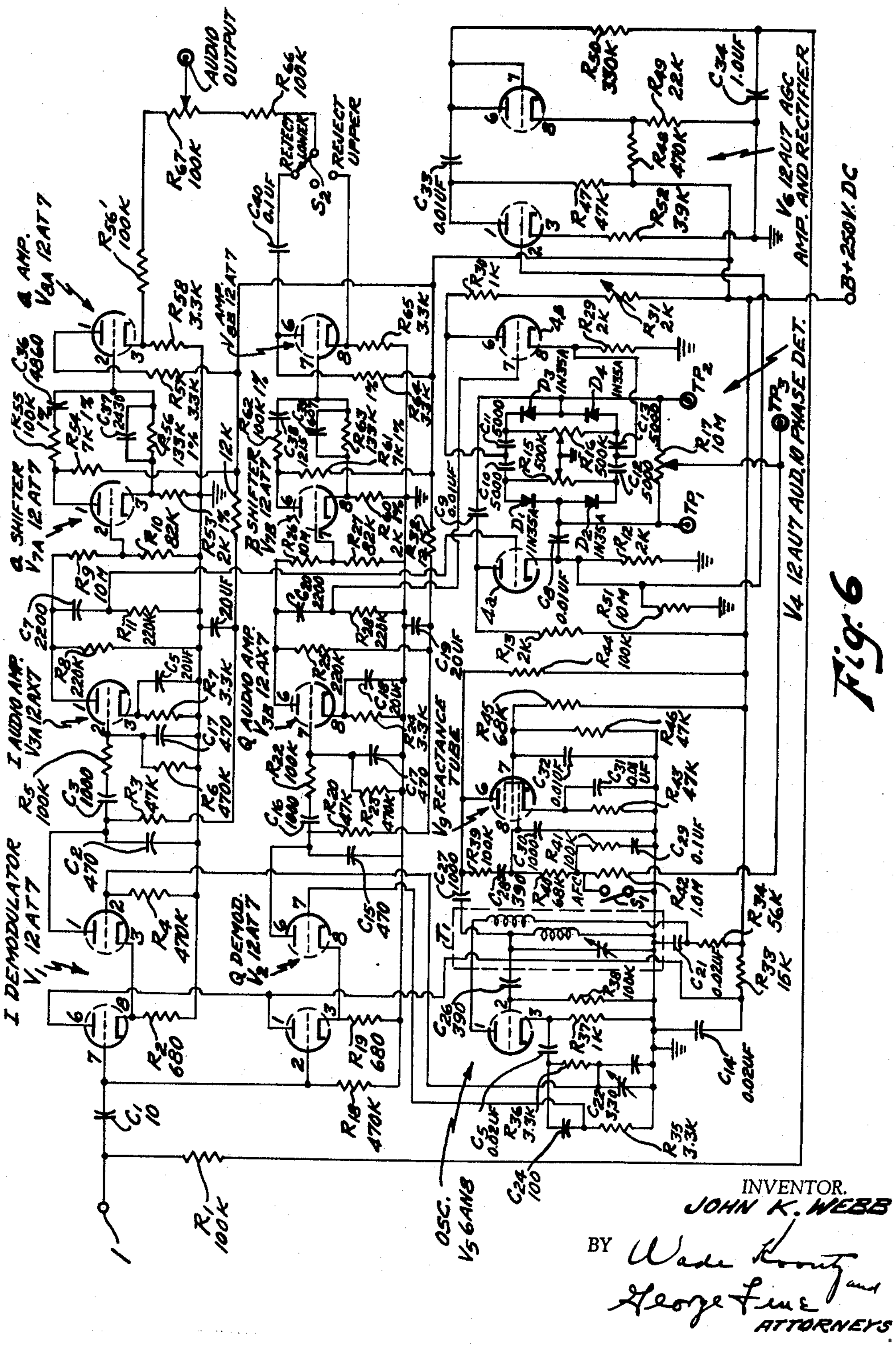
Fig. 6 shows the schematic diagram of the synchronous detection system which may be utilized to adapt a superheterodyne receiver to synchronous detection.

Now referring to Fig. 6 showing the schematic diagram of the synchronous detection system which may be utilized as an adapter for a superheterodyne receiver, the IF signal from the superheterodyne is fed into terminal 1. The IF signal is fed simultaneously into I demodulator and Q demodulator. The I demodulator is comprised of vacuum tubes $V_1$ and the Q demodulator of tubes $V_2$. The I and Q demodulators are of the product detector category. The I and Q demodulators simultaneously receive local injection voltages. The local injection voltages are in phase quadrature. The local injection voltage is generated in conventional local oscillator which is comprised of $V_5$. The 90° local oscillator phase shift is obtained from two 45° phase shifts through C24, R35, R36, C22 and C23. The output signals from the I and Q demodulators are fed through their respective I and Q amplifiers. The I amplifier is comprised of tube $V_{3A}$ and the Q amplifier of tube $V_{3B}$. From the I amplifier the signal is fed simultaneously to the alpha phase shifter and to the audio phase detector through phase inverter tube $4_A$. The alpha phase shifter is comprised of tube $V_{7A}$. The signal from the Q amplifier is fed simultaneously to the beta phase shifter and through phase inverter, tube $4_B$, to the audio phase detector. The beta shifter is comprised of tube $V_{7B}$. If an error signal is derived in the audio phase detector it is fed to conventional reactance tube $V_9$ and from there it is fed to $V_6$, the local oscillator.

The phase detector circuit is comprised of two basic rectifiers, connected so that their D.C. outputs are of the same polarity and the A.C. input signals are cancelled in the output. This arrangement allows fast response in the phase-control loop while being unaffected by the audio signals themselves. The phase detector output voltage appears at $TP_3$ and is applied as a control signal to the local oscillator reactance tube to correct for phase errors.

Tubes $V_7$ and $V_8$ and their associated networks are conventional 90° audio phase shift networks. The networks provide "Q" channel interference audio 180° out of phase with either upper or lower sideband of "I" channel audio, depending on the position of switch $S_2$. When the local oscillator is synchronized or "locked" on a signal, audio resulting from both upper and lower sidebands appear at "I" channel output and no sideband audio appears at "Q" channel output. If interference appears in the lower sideband it will result in interfering audio in both "I" and "Q" channel lower sideband outputs. By switching $S_2$ to "reject lower," all interfering signals in the lower sideband will cancel in the combined "I" and "Q" outputs and all desired information present in the lower sideband will be retained for addition with upper sideband audio.

Upper sideband interference may be similarly rejected by switching to "reject upper." The "Q" channel has no components of the desired double sideband signal, so it cannot cause cancellation of the desired audio from either sideband. When the local oscillator is "unlocked" by grounding the audio phase detector output (AFC off), audio appears in both "I" and "Q" channels and the adapter becomes a SSB converter. SSB, or either sideband of a DSB, AM, NFM, or PM signal may be selected. This interference rejection feature may also be utilized to improve CW reception.

The AGC circuit is comprised of tube $V_6$. It receives an audio signal from the audio phase detector and the AGC voltage is fed back to input 1 and thus to the IF strip of the superheterodyne being adapted to synchronous detection. The AGC circuit works with all the aforementioned types of signals. The attack time is controlled by R50 and C34 and the release time is controlled by C34 and the resistance looking back into the superheterodyne receiver. AGC as utilized is superior to conventional AVC, as AVC regulates on carrier information and this circuit operates on audio output independent of modulation percentage.

Other objects and advantages of my present invention will readily occur to those skilled in the art to which the same relates.

What is claimed is:

1. In a system for adapting a superheterodyne communications receiver to synchronous detection, means to apply the intermediate frequency signal from said superheterodyne receiver simultaneously to the input of two channels, demodulator means at the input of each channel, each of said demodulator means also receiving an injection voltage, said injection voltages being in phase quadrature, each of said demodulators producing an audio output signal whenever in-phase components of said intermediate frequency signal and said injection signal are present therein means to amplify the audio demodulated signal in each of said channels, audio phase detector means to compare the phase of the said amplified signals to each other, said audio phase detector means adapted to receive each of said amplified audio signals at a separate input and operating to produce a direct current control output signal of the proper polarity only when each of said demodulator means contain said in-phase components, means to control said injection voltages by utilizing said direct current control signal, means to rectify a signal received by way of said audio phase detector means, said rectified signal being applied to said input of said two channels, means to shift the phase of each of said audio amplified signals, and means to select said phase shifted audio signals to provide an audio output signal representative of said input intermediate frequency signal.

2. In a system for adapting a superheterodyne communications receiver to synchronous detection, means to apply the intermediate frequency signal from said superheterodyne communications receiver to the input of two channels, demodulator means at the input of each of said channels, oscillator means generating an injection voltage, two phase shifting means receiving at their inputs said injection voltage, one of said means shifting said injection voltage plus 45 degrees, and being then fed to one of said demodulators, the other said phase means shifting said injection voltage minus 45 degrees and then being fed to the other of said demodulators, each of said demodulator means operating to produce an audio output signal whenever in-phase components of said intermediate frequency signal and said injection signal are present therein, audio phase detector means having two inputs, each of said inputs receiving an audio signal from its corresponding demodulator means, said audio phase detector means operating to convert said two audio signals into a direct current control signal of the proper polarity only when said demodulator means are in receipt of said in-phase components, means to control said oscillator by utilizing the direct current control signal resulting from said audio phase operation means, means to rectify a further signal provided by way of said audio phase detector means, means to apply said rectified signal to control said intermediate frequency signal at said input of said two channels, means to phase shift each of said audio signals from each of said demodulator means, and means to combine said phase shifted signals to provide an output audio signal solely representative of said intermediate frequency signal.

3. In a system for adapting a superheterodyne communications receiver to synchronous detection, means to apply the intermediate frequency signal from said superheterodyne communications receiver to the input of two channels, demodulator means at the input of each of said channels, oscillator means generating an injection voltage, two phase shifting means receiving at their inputs said injection voltage, one of said means shifting said injection voltage plus 45 degrees, and being then fed to one of said demodulators, the other said phase means shifting said injection voltage minus 45 degrees and then being fed to the other of said demodulators, each of said demodulators operating to produce an audio signal when in receipt of said injection voltage and said intermediate frequency signal having in-phase components, audio phase detector means having two inputs, each of said inputs receiving an exclusively audio signal from its corresponding demodulator means, said audio phase detector means operating to convert said two audio signals into a direct current control signal only when both of said demodulator means are in receipt of said inphase components, means to rectify an exclusively audio signal also provided by way of said audio phase detector means, said rectified signal being utilized to control said intermediate frequency signal appearing at said input to said two channels, a pair of audio phase shifting means to shift each of said audio signals received from each of said demodulator means, and means to select an audio output signal solely representative of said intermediate frequency signal by utilizing each of said audio phase shifted signals in combination.

4. In a system for adapting a superheterodyne communications receiver to synchronous detection, means to apply the intermediate frequency signal from said superheterodyne communications receiver to the input of two channels, demodulator means at the input of each of said channels, oscillator means generating an injection voltage, two phase shifting means receiving at their inputs said injection voltage, one of said means shifting said injection voltage plus 45 degrees, and being then fed to one of said demodulators, the other said phase means shifting said injection voltage minus 45 degrees and then being fed to the other of said demodulators, each of said demodulator means producing an audio signal when in receipt of said intermediate signal and said injection signal both said signals having in-phase components, a pair of means to amplify each of said audio signals means to phase compare each of said amplified audio signal to the other, said phase comparison means supplying a direct current control signal only when said phase comparison means is in receipt of said pair of amplified audio signals, means to control said oscillator by utilizing the direct current signal resulting from said phase comparison, means to rectify an exclusively audio signal provided by way of said phase comparison means, means to apply said rectified signal to control said input intermediate frequency signal, a pair of means to phase shift each of said amplified audio signals, and means to select said phase shifted audio signals to provide an audio output signal representative of said input intermediate frequency.

5. In a system for adapting a superheterodyne communication receiver to synchronus detection as defined in claim 1 wherein said selecting means includes phase controlling networks connected to be selectively operable in parallel circuitry to reject signals interfering with said input intermediate frequency signal.

6. In a system for adapting a superheterodyne communication receiver to synchronous detection as defined in claim 4 wherein said selecting means includes phase controlling networks connected to be selectively operable in parallel circuitry to combine each of said phase shifted audio signals to reject any signals interfering with said intermediate frequency signal.

7. In a system for adapting a superheterodyne communications receiver to synchronous detection, means to simultaneously apply the intermediate frequency signal therefrom to the input of a pair of demodulator means, oscillator means generating an injection voltage, a pair of phase shifting means receiving said injection voltage, one of said phase means shifting said injection voltage plus 45 degrees for application to one of said pair of demodulator means, the other said phase means shifting said injection voltage minus 45 degrees for application to the other of said pair of demodulator means, each of said demodulator means operating to produce an audio signal in response to in-phase components of said intermediate frequency signal and said phase shifted injection voltage, a pair of means to amplify each of said audio signals from each of said demodulator means, audio phase detector means receiving at separate inputs each of said amplified audio signals, said audio phase detector means providing a direct current control signal in response only to a pair of amplified audio signals, reactance tube means solely responsive to said direct current signal, said reactance tube means controlling said oscillator means, means to rectify an exclusively audio signal also provided by said audio phase detector means, said rectified signal being utilized to control said input intermediate signal, a pair of means to shift the phase of each of said amplified audio signals, and means to combine said phase shifted audio signal to provide an audio output signal representative of said input intermediate frequency signal while rejecting undesirable components thereof.

References Cited in the file of this patent

UNITED STATES PATENTS

| | | |
|---|---|---|
| 2,231,704 | Curtis | Feb. 11, 1941 |
| 2,797,314 | Elgin | June 25, 1957 |
| 2,836,712 | Crosby | May 27, 1958 |

OTHER REFERENCES

"Practical Single-Sideband Reception," by Norgaard in "QST" July 1948, pp. 11–15.